United States Patent [19]

Kobayashi

[11] Patent Number: 4,835,601
[45] Date of Patent: May 30, 1989

[54] COLOR VIDEO GENERATING APPARATUS USING ACOUSTO-OPTICAL DEFLECTOR

[75] Inventor: Koji Kobayashi, Hino, Japan
[73] Assignee: Kowa Company Ltd., Japan
[21] Appl. No.: 253,375
[22] Filed: Sep. 30, 1988

Related U.S. Application Data

[63] Continuation-in-part of Ser. No. 35,091, Apr. 6, 1987, abandoned.

[30] Foreign Application Priority Data

Apr. 9, 1986 [JP] Japan .................................. 61-80236

[51] Int. Cl.⁴ ............................................... H04N 9/10
[52] U.S. Cl. ......................................... 358/53; 358/60; 358/63
[58] Field of Search ....................... 358/53, 56, 60, 61, 358/63

[56] References Cited

U.S. PATENT DOCUMENTS

| | | | |
|---|---|---|---|
| Re. 29,670 | 6/1978 | Spaulding ........................ | 358/60 X |
| 3,597,536 | 8/1971 | Fowler ................................. | 358/63 |
| 4,093,976 | 6/1978 | Das ..................................... | 358/53 |
| 4,274,109 | 6/1981 | Whitby ................................ | 358/53 |
| 4,714,956 | 12/1987 | Yin ...................................... | 358/60 |
| 4,720,747 | 1/1988 | Crowley ........................... | 358/60 X |

OTHER PUBLICATIONS

Article entitled "Optics for Laser Raster", by Robert H. Webb, pp. 3680–3683, Applied Optics, vol. 23, No. 20/15, Oct. 1984.

Primary Examiner—James J. Groody
Assistant Examiner—E. Anne Faris
Attorney, Agent, or Firm—Bruce L. Adams; Van C. Wilks

[57] ABSTRACT

Disclosed is a laser beam scanning system having a laser source for producing a plurality of laser beams each having a different wavelength which are deflected by an acousto-optical deflector to scan an object in at least one direction to produce a video signal representative of the object color image. Because of color dispersion inherent to the acousto-optical deflector, the angle of deflection is dependent on the wavelength of the laser beams. To compensate for the color dispersion, a signal processor is provided to process the video signals derived from the scanning of the object in such a manner that the video signals are processed differently in terms of scanning time one from the other and are output using the same timing.

19 Claims, 6 Drawing Sheets

COLOR VIDEO GENERATING APPARATUS USING ACOUSTO-OPTICAL DEFLECTOR

This is a continuation-in-part of application Ser. No. 035,091 filed Apr. 6, 1987, now aband:

BACKGROUND OF THE INVENTION

1. Field of the Invention

This invention relates to a laser beam scanning system, and more particularly to a laser beam scanning system for scanning an object by using a plurality of laser beams each having a different wavelength from the others, photodetection and photoelectrical conversion of the reflected or transmitted laser beams being then employed to produce image data of the object.

2. Description of the Prior Art

The flying spot scanning type video input system in which an object is scanned by a laser beam spot and the light reflected or transmitted therefrom is picked up by a photosensor to obtain video signals features a number of advantages, such as the brightness and convergence of the laser beam and its coherence, and it is in wide use in industrial and medical fields.

Using the laser beam to scan two-dimensionally, horizontally and vertically, and having the scanning rate correspond to the raster scan of an ordinary TV system enables a real-time video image to be obtained which is free of residual image and as such has a broader range of use and markedly improved operability.

In such a system, means for deflecting the laser beam to scan horizontally or vertically include mechanically driven methods that employ a swinging mirror or a polygonal mirror or other such rotating multifaceted mirror, and non-mechanical methods such as acousto-optical deflectors and the like.

However, in the case of ordinary raster scanning, with the NTSC system the horizontal scanning frequency is 15.75 KHz and the vertical scanning frequency is 60 Hz, while in the case of high-definition television the horizontal scanning frequency is even higher. As a result, using a mechanical drive for vertical deflection of the laser beam provides sufficient tracking and control stability, but there have been no low-cost, reliable mechanical control methods for providing the horizontal deflection because of the very high frequency that is involved.

Mechanical drive systems that employ swinging mirrors or rotating multifaceted mirrors do not give rise to color dispersion even when using a plurality of laser beams each having a different wavelength, and while high scanning frequencies of 10 KHz or more are possible there are problems relating to the durability or the working life of the mechanisms, while wobble of the mirror axis and the like make it difficult to produce a precise raster. On the other hand, because methods using acousto-optical deflectors have no mechanically controlled parts, they are very reliable, but involve the following problems.

FIG. 6 shows the operation of an acousto-optical deflector 60; the acousto-optical deflector 60 is driven by a signal source 61. If the ultrasonic driving frequency is f, the wavelength of the incident laser beam is $\lambda$ and the ultrasonic velocity is v, the angle of diffraction $\theta$ of the first-order diffraction obtained by the operation of the acousto-optical deflector is:

$$\theta \simeq \lambda f / v$$

However, with such a deflection system, unlike a mechanically driven mirror type method, because the angle of diffraction is dependent on the wavelength of the incident beam, color dispersion occurs. For example, when the three-color R (red), G (green), B (blue) laser beams shown in FIG. 7 impinge on the acousto-optical deflector 60, the longer the wavelength, the larger the angle of diffraction becomes, so first-order diffraction color dispersion is produced.

Therefore, when a laser source producing a plurality of laser beams is used to obtain chromatic information about an object, there has been a drawback that the coloring of the images has been difficult.

In view of this problem, there are known techniques comprising the use of a plurality of acousto-optical deflectors, one for each laser beam wavelength, and combining the beams following the deflection; or a single acousto-optical deflector is used to deflect a plurality of laser beams of differing wavelengths, and the resultant color dispersion that is produced is corrected by means of optical elements such as mirrors and prisms. With either method the optical system becomes complex and costly, and it is also extremely difficult to construct a correcting optical system which is capable of perfectly combining a plurality of laser beams of different wavelengths over a wide range of deflection angles. In addition, the aforesaid type of correcting optical system is set for the wavelengths of the laser beams, making it difficult to readily adapt it should it become necessary to change to a laser source of a different wavelength.

In addition to acousto-optical deflectors, there have been developed non-mechanical laser-beam deflection devices which can provide high scanning frequencies, but most of these devices employ optical diffraction or refraction which in itself gives rise to color dispersion, so there are problems of resolution and reliability and few of the devices have been put to practical use.

Thus, a reliable laser beam scanning system that provides laser beam scanning compatible with ordinary TV raster scanning and can perform input processing of color images in real time has not yet appeared.

SUMMARY OF THE INVENTION

It is therefore an object of the present invention to provide a laser beam scanning system that is capable of producing a color video signal on a real-time basis.

It is another object of the present invention to provide a laser beam scanning system that is capable of producing a color video signal free from color dispersion.

According to the present invention, a laser beam scanning system comprises a laser source for producing a plurality of laser beams each having a different wavelength; a deflector for deflecting the laser beams at an angle of scanning deflection which is dependent on the wavelength of the laser beam resulting in color dispersion of the deflector; a plurality of photosensors each sensitive to the wavelength of a corresponding deflected laser beam for photoelectrically converting the laser beam into a video signal of an object corresponding to one of the laser beams of a predetermined wavelength; and a signal processor for processing the video signals derived from the photosensors in such a manner that each video signal is process differently in terms of scanning time-base from the others and is output at the same timing, so that all the video signals are color-corrected to compensate for the color dispersion.

According to the preferred embodiment of the present invention, a video signal corresponding to the laser beam of a predetermined wavelength which suffers from less color dispersion is processed later in terms of the scanning time than video signals suffering from more color dispersion, preferably so later, that the angle of deflection of the video signal substantially coincides with the angle of deflection corresponding to the other video signals of a different color component.

With the aforesaid construction, time-base type chromatic shift appearing in the video data output of the photosensor means as a result of differences in the points at which the scanning laser beams reach the object resulting from color dispersion in the deflection means can be corrected by changing the speed and timing at which the video data is extracted for each wavelength, enabling the effects on the acquired video data of color dispersion produced by the deflection means to be removed completely.

BRIEF DESCRIPTION OF THE DRAWINGS

The objects and features of the present invention will become more apparent from the following detailed description taken in conjunction with the accompanying drawings in which.

DETAILED DESCRIPTION OF THE PREFERRED EMBODIMENTS

Figure 1:
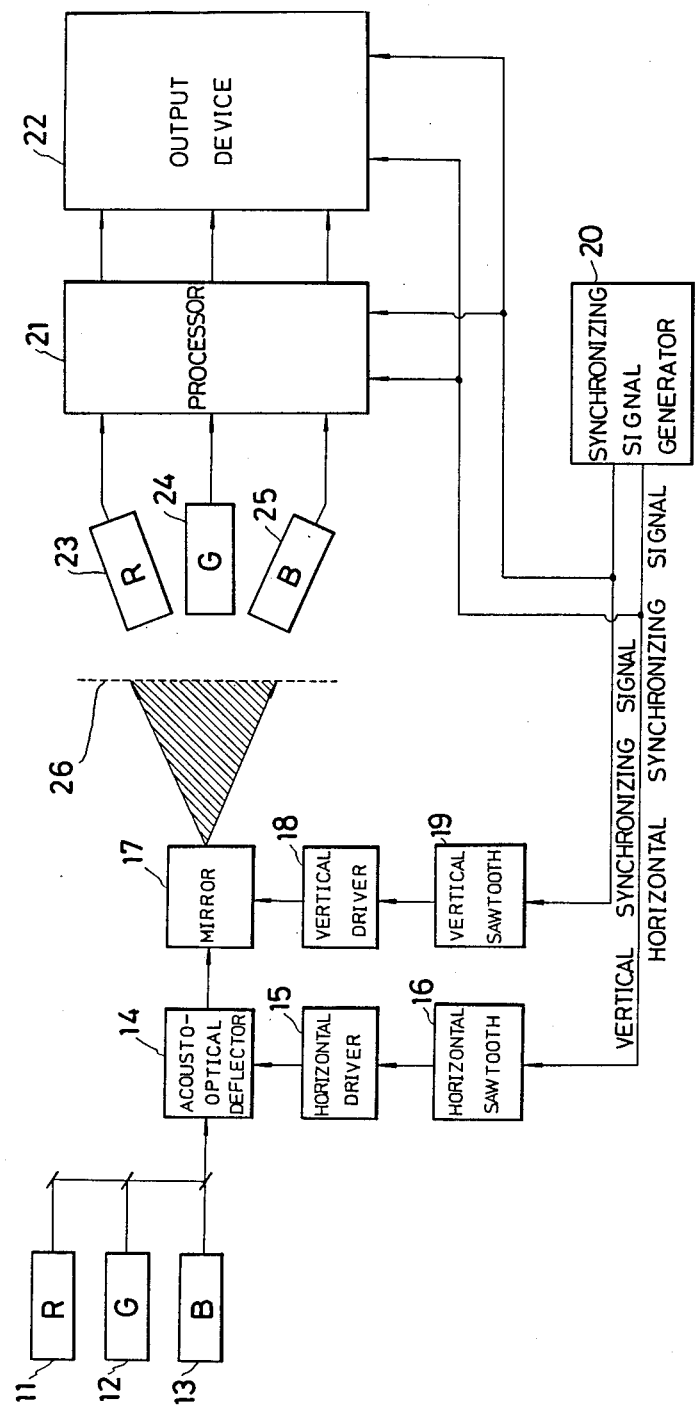
FIG. 1 is a block diagram showing the overall structure of a laser beam scanning system according to the present invention.

FIG. 1 is a block diagram showing the construction of a laser beam scanning system according to the present invention. Here, both the scanning system and photosensor system are shown. The construction of the scanning system is as follows.

With reference to FIG. 1, as the light source, there are provided three laser light sources 11, 12 and 13 for the three primary colors Red, Green and Blue (RGB) for obtaining color information of an object. The laser beams output by the laser light sources 11, 12 and 13 are deflected horizontally and vertically toe effect two-dimensional scanning of an object 26. In the present embodiment, an acousto-optical deflector 14 is used to effect the horizontal deflection. A mirror device 17 comprised of a swinging mirror or a polygonal mirror or the like is used for the vertical deflection of the laser beams. The horizontal deflector 14 and the vertical deflector mirror device 17 are controlled by drivers 15 and 18, respectively, which are adapted to the respective drive systems thereof. Sawtooth waveform control signals are input to the drivers 15 and 18. The respective sawtooth waveform control signals are produced by generators 16 and 19. The generators 16 and 19 are operated in synchronization with horizontal synchronizing signals and vertical synchronizing signals generated by a synchronizing signal generator 20.

In accordance with the above structure laser beams from the laser light sources 11, 12 and 13 scan the object 26 two-dimensionally and the Red, Green and Blue components of the laser beams that are reflected or transmitted therefrom are detected by and input into three corresponding photosensors 23, 24 and 25.

Each of these photosensors consists of a photomultiplier, or a photoelectric converter such as a photodiode or the like and an RGB color filter.

As mentioned in the above, color dispersion is produced when an acousto-optical deflector is used to deflect the laser beams, and the video signals output by the photosensors 23, 24 and 25 are therefore affected thereby. In this embodiment, the color dispersion is corrected by a processor 21 provided in the photodetection system. The processor 21 consists of a video memory and a microprocessor device to control the video memory. The Red, Green and Blue color component data corrected by the processor 21 for the color dispersion are transmitted to an output device 22 such as a video monitor or a color recorder, or to another output device such as a video data processor.

The operation of photodetection system formed by the processor 21 and the output device 22 is controlled by the horizontal and vertical synchronizing signals output by the synchronizing signal generator 20 which controls the operation of the scanning system, providing synchronization of the scanning and photodetection systems.

Figure 2:
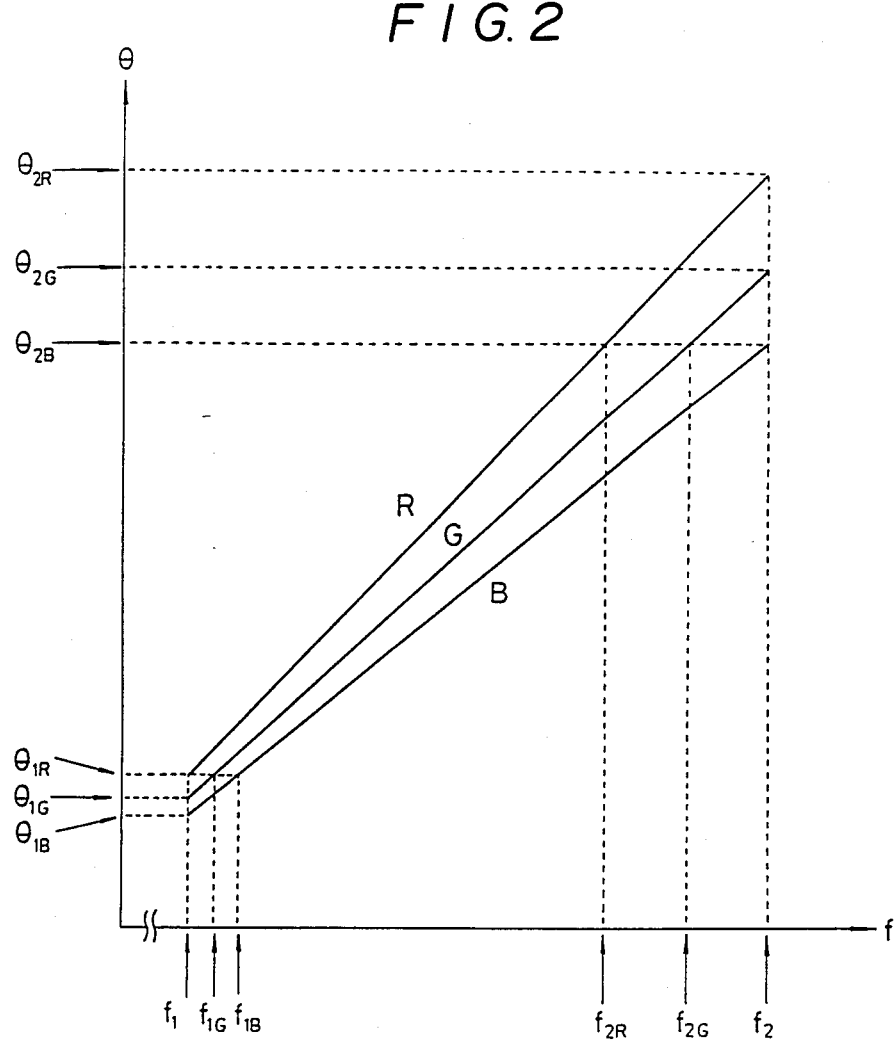
FIG. 2 is a graph showing the relationship between the ultrasonic drive frequencies of the acousto-optical deflector and the deflection angle for each of the RGB components.

To explain the compensation operation performed by the photodetection system processor 21, FIG. 2 shows the dependency on the laser beam wavelength of the relationship between the drive frequency of the acousto-optical deflector that performs the horizontal deflection and the deflection angle. In the figure, the horizontal axis shows the ultrasonic frequency f of a drive signal that drives the acousto-optical deflector, and the vertical axis shows the obtained angle of deflection.

If $\lambda_R$, $\lambda_G$ and $\lambda_B$ are the wavelengths of the RGB laser beams and v is the ultrasonic velocity, the angle of deflection $\theta$ will be:

$$\theta \approx \lambda f / v$$

providing the three straight lines for the three primary colors as shown in FIG. 2.

With respect to the ultrasonic frequency $f_1$ in FIG. 2, R, G, B deflection angles are deviated from each other and become $\theta_{1R}$, $\theta_{1G}$ and $\theta_{1B}$, respectively, due to chromatic deflectivity of the acousto-optical deflector.

Regarding the higher-frequency part of frequency $f_2$, the respective R, G, B deflection angles become $\theta_{2R}$, $\theta_{2G}$ and $\theta_{2B}$. With respect to the lower-frequency part, if the R deflection angle obtained at a frequency of $f_1$ is regarded as $\theta_{1R}$, the frequencies at which the same deflection angle will be obtained for G and B will be $f_{1G}$ and $f_{1B}$.

If, with respect to the higher-frequency part of frequency $f_2$, the B deflection angle is $\theta_{2B}$, the frequencies at which the same deflection angles will be obtained for R and G will be $f_{2R}$ and $f_{2G}$.

When the processor 21 shown in FIG. 1 is processing the output signals of the photosensors 23, 24 and 25, the ranges of frequency utilized with respect to the R, G and B colors are $f_1 - f_{2R}$, $f_{1G} - f_{2G}$ and $f_{1B} - f_2$, all of which determine the same angular sweeping range $\theta_{2B} - \theta_{1R}$ of the R, G and B laser beam components as shown in FIG. 2.

Figure 3:
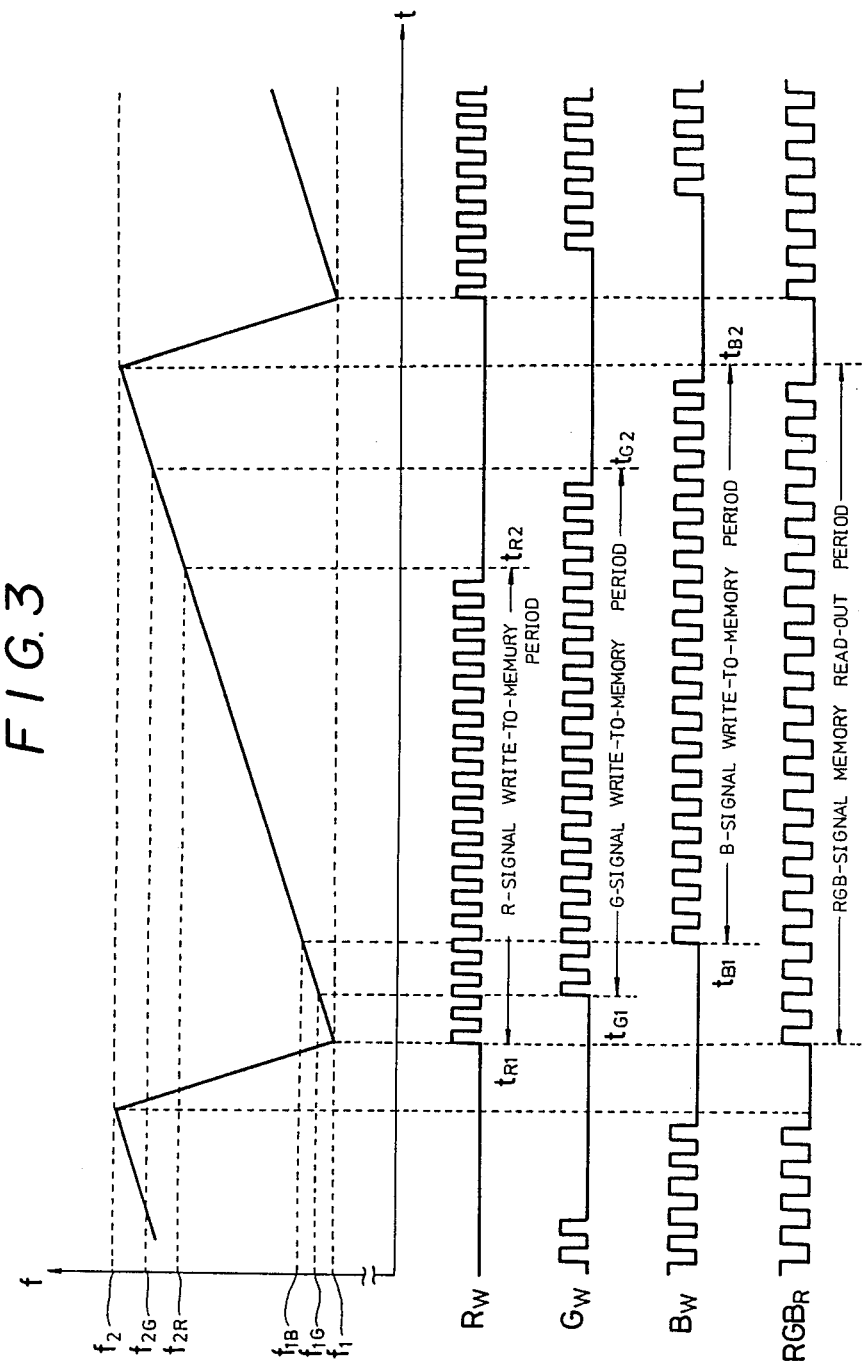
FIG. 3 is an explanatory view showing the color dispersion compensation principle, using memories.

FIG. 3 shows the horizontal scanning in the construction of FIG. 1, and signal processing by the processor 21 on the photodetection side. The graph in the upper part of FIG. 3 shows linear changes in variable frequency of the drive signal in the acousto-optical deflector during one scanning period of the object. As stated above, the range of such frequency change is set within $f_1 - f_2$.

When the object 26 is scanned using the above horizontal deflection, owing to the differences in the deflection angles of the R, G and B components, the R, G and B laser beams emitted at the same time will asynchronously reach the object at a different point along the object scanning line or locus. If the result of the detection and photoelectrical conversion by the photosensors 23, 24 and 25 were thus directly output as were, color dispersion would be produced in the output color image.

Accordingly, in this embodiment, the outputs of the photosensors 23, 24 and 25 are first stored in a memory provided in the processor 21, and color dispersion is eliminated by controlling the timing of the memory write and read operations. That is, with respect to the video signals output by the photosensors 23, 24 and 25, data obtained at a specific time-base that differs with respect to each wavelength is written into memory, and read out using an identical time-base, thereby normalizing the output image data. In this embodiment, to store the photosensor outputs in memory, it is necessary to set a specific write period that has a different time-base for each of the R, G and B components within one horizontal scannig period, and at the read-out time, to apply an identical read-out timing in respect of each component. In the write-to-memory process, different time intervals sifted from each other are assigned to waveforms $R_w$, $G_w$ and $B_w$ as shown in FIG. 3.

That is, when the ultrasonic drive frequency of the acousto-optical deflector 14 is $f_1$ and R component laser beam is beamed at a point on the object as in the case of the example shown in FIG. 2, the G and B component laser beams will be beamed at the same point when the ultrasonic drive frequencies are $f_{1G}$ and $f_{1B}$. Hence, the timings at which the R, G and B component video signals taken from the photosensors 23, 24 and 25 start to be written to the memory are set to $t_{R1}$, $t_{G1}$ and $t_{B1}$, respectively. Also, the timing of the completion of the write-to-memory of the R, G and B components, using as the reference a frequency $f_2$ designated on the basis of the deflection angle of the B component, and considered similarly to the above, are set to $t_{R2}$, $t_{G2}$ and $t_{B2}$. Because the duration of the write interval differs with each wavelength, it is necessary to use different values for the write-to-memory speed for each of the R, G and B components. As for read-outs, as shown by an $RGB_R$ waveform in FIG. 3, the R, G and B components are read out simultaneously to synchronize the same.

In FIG. 3, for simplification, resolution per horizontal sweep period has been set at 20 bits, but if required a resolution value of 256 bits, 512 bits or 1024 bits per scanning line may be used, as desired.

Figure 4:
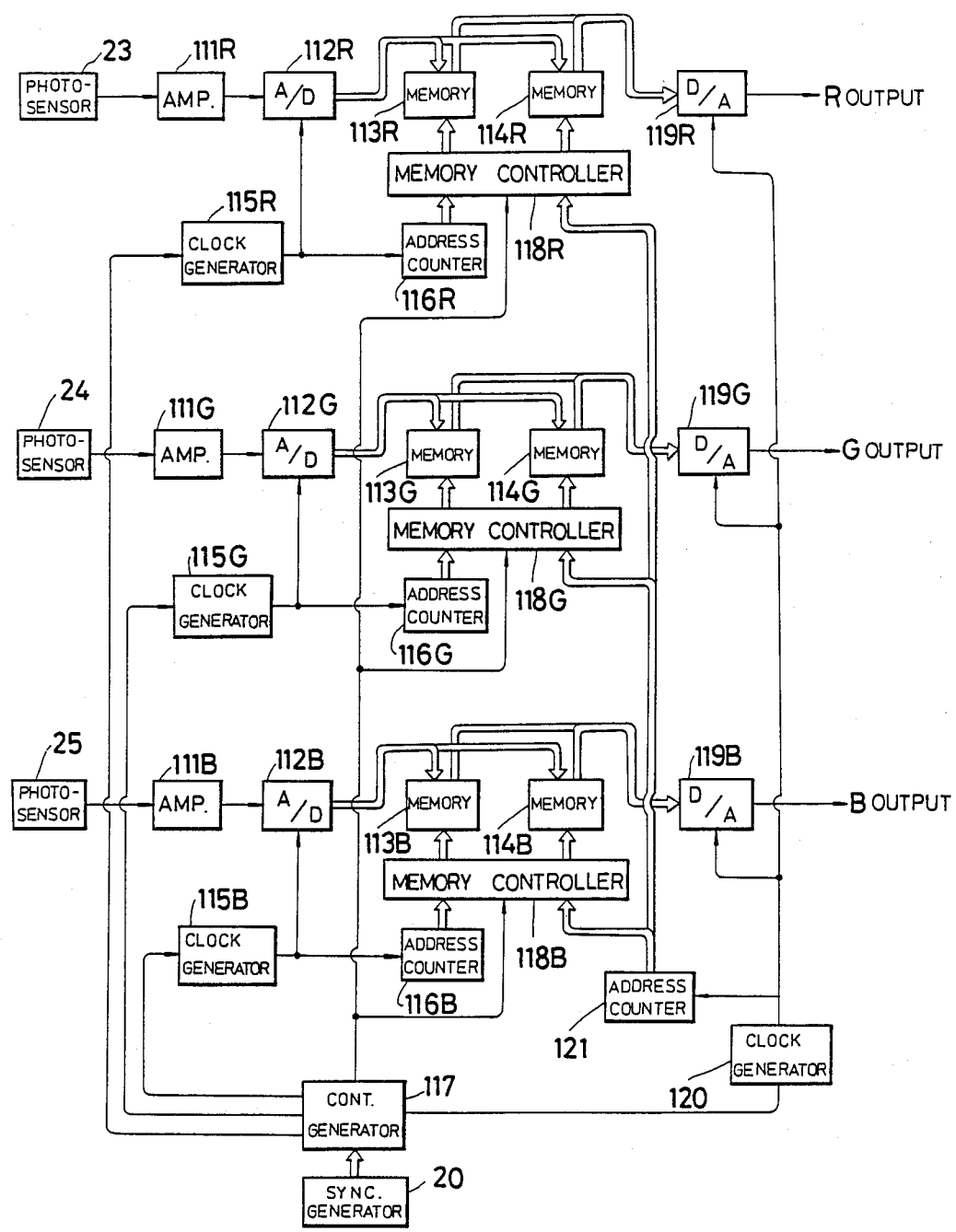
FIG. 4 is a block diagram showing the construction of the processing devices shown in FIG. 1.

FIG. 4 shows a specific construction of the processor 21 for performing the above control. Here, for the processing of the outputs of the photosensors 23, 24 and 25, circuit blocks of identical construction are provide d for each of the R, G and B components. Each of the blocks is identically numbered and is differentiated by the use of the letters "R", "G" and "B." Hereinbelow the circuit blocks will be referred to by number only, except when otherwise necessary.

As shown in the drawing, the signals output by the photosensors 23, 24 and 25 are amplified to the required level by an amplifier 111 and converted to digital data of the required number of bits by an A/D converter 112. The thus converted digital data is stored in a memory 113 or a memory 114.

The signal processor 21 processes the video signal components so that they are delayed, compressed or expanded on a time coordinate which varies for each wavelength.

Output from the memory 113 and memory 114 is converted back into analog data by a D/A converter 119 and is then output to the output device 22.

Selection of memory 113 or 114 when it is time to write data to memory is performed by a control signal generator 117. Specifically, the control signal generator 117 applies a signal via a memory controller 118 to select R, G or B component memory 113 or 114. At the same time, the address of the memory 113 or 114 to which the data is to be written, is designated via write operation clock generators 115R, 115G and 115B and address counters 116R, 116G and 116B. At this time the clock generators 115R, 115G and 115B are independently controlled to achieve the aforementioned timing control and speed differentiation from frequency to frequency.

As data read-out from the memories is carried out simultaneously, a single read-out operation clock generator 120 and address counter 121 are provided for the common use of the R, G and B components. These operations are also controlled by the control signal generator 117. In the course of the above operations, processing by the control signal generator 117 proceeds in synchronization with the synchronizing signals output by the synchronizing signal generator 20.

The operation of the above construction will now be explained hereinbelow.

Figure 5:
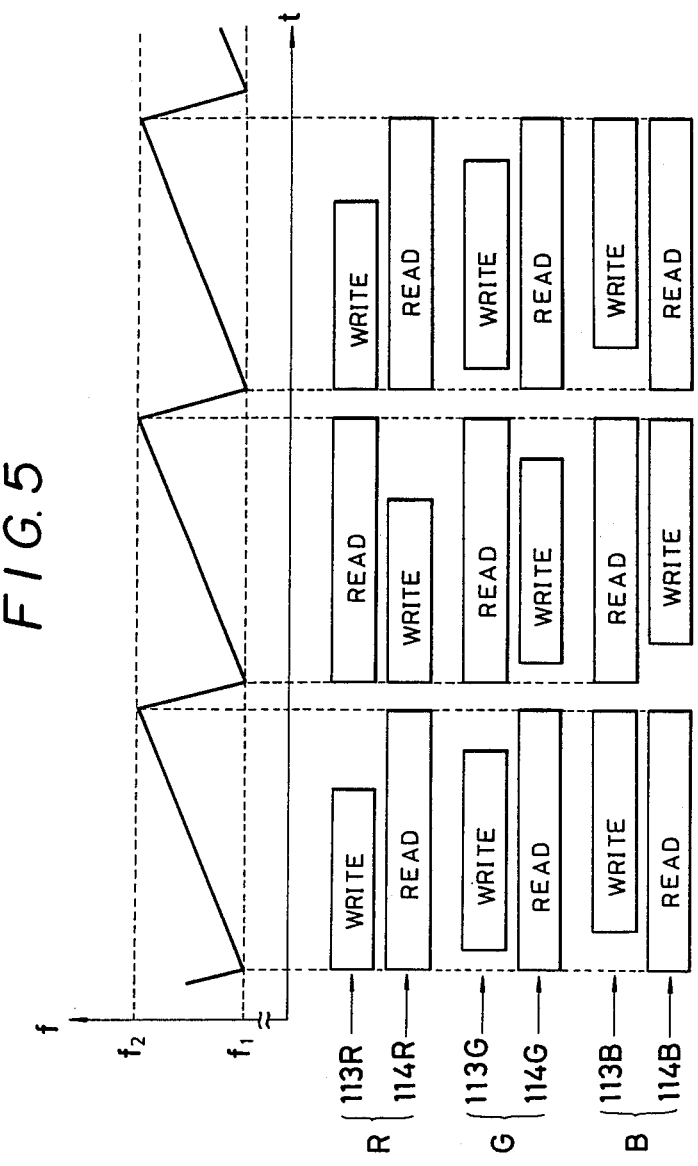
FIG. 5 is an explanatory diagram showing how the memory of FIG. 4 is allocated.
Figure 6:
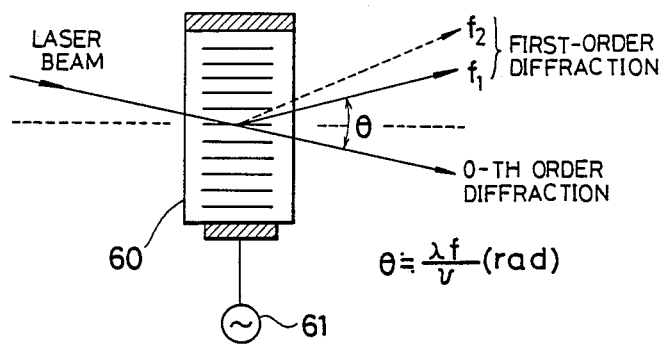
FIG. 6 is an explanatory diagram showing the operating principle of the acousto-optical deflector.
Figure 7:
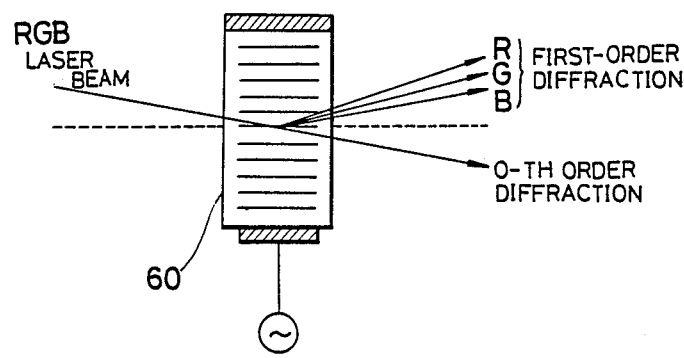
FIG. 7 is an explanatory diagram of the color dispersion produced by the acousto-optical deflector.

With reference to FIG. 5, which shows the allocation of the memories 113 and 114 to produce the write and read-out timing of FIG. 3, in a single scanning period one memory 113, for example, is used, for example, to write the data and the other memory 114 is seleted for read-out of the data that was written in the memory 114 during the preceding scanning period. As explained with reference to FIG. 3, a different write-to-memory period is set for each of the R, G and B components.

With the above construction, at the completion of each single horizontal scan, each of the R, G and B component memories 113 and 114 has stored therein horizontal scan data on the object, for each component. Again, as already stated in the foregoing, the write-to-memory timing and speed are controlled in accordance with the differences in the deflection angles among the R, G and B components so that the photosensor output signals having a different time-base for each component are utilized. By means of this write control, at the completion of the write operation the memories 113R, 113G and 113B or 114R, 114G and 114B will have stored therein, at an identical address, counting from the top address, the R, G and B data which represents the optical characteristics at the same location on the object.

Therefore, by afterwards performing a sequential read-out from the memory starting from the top address, color image data free of color dispersion can be obtained.

In accordance with the above embodiment, high-speed horizontal scanning can be performed using acousto-optical deflectors, in addition the color dispersion which is a characteristic of such acousto-optical deflectors can be entirely eliminated, thereby also enabling the input processing of color images, such as moving pictures and the like, to be performed. Because also the horizontal scanning sis carried out by acousto-optical deflectors which do not require high-precision mechanical control, stable horizontal scanning over a long period becomes possible. With respect to vertical deflection, relatively low-cost mirror devices are used, and fully adequate durability and precision for the deflection frequency can be assured.

Also, because with this embodiment the effects of color dispersion are corrected by a purely electronic construction, the cost is lower than the conventional optical correction systems, and accurate, stable correction is possible. Moreover, if it becomes necessary to change the wavelength of the scanning laser beams, it is very easy to perform this change.

Furthermore, the above construction can be used to remove not only the color dispersion that is unavoidably produced by acousto-optical deflectors; the effects of single-dimensional chromatic aberration generated by other optical systems or the like also may be eliminated, if the conditions under which generation occurs are known.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention should not be limited to the particular embodiment disclosed as the best mode contemplated for carrying out the invention, but that the invention will include all embodiments falling within the scope of the appended claims.

What is claimed is:

1. A laser beam scanning system for use in scanning an object in at least one direction to produce a video signal representative of a color image of the object, comprising:
   laser source means for producing a plurality of laser beams each having a different wavelength;
   a signal source for producing a drive signal having a frequency which can be changed during one scanning time period;
   an acousto-optical deflector responsive to the drive signal for deflecting the laser beams simultaneously at an angle of scanning deflection which is dependent on the drive signal frequency and the wavelength of each laser beam, resulting in color dispersion at the output of the deflector;
   A plurality of photosensors each sensitive to the corresponding wavelength of the respective deflected laser beam and operative during the scanning of the object with the respective deflected laser beam for photoelectrically converting the respective laser beam from the object into a video signal component of a color tone corresponding to the wavelength; and
   a signal processor for processing the video signal components derived from the respective photosensors in such a manner that the video signal components are delayed, compressed or expanded based on a time coordinate which varies for each video signal component while the video signal components are input asynchronously with each other due to the color dispersion at the output of the deflector to thereby output the processed video signal components at the same timing in terms of a scanning time to form a video signal so that the influence of the color dispersion at the output of the acousto-optical deflector is eliminated from the video signal.

2. A laser beam scanning system as set forth in claim 1; wherein the signal processor electronically converts the video signal components from the photosensors which suffer from the color dispersion at the output of the acousto-optical deflector into video signal components which suffer from less color dispersion relative to each other on a real time basis.

3. A laser beam scanning system as set forth in claim 1; wherein the signal processor adjusts the time of the input and output of video signal components to eliminate the influence of the color dispersion caused by the acousto-optical deflector due to the deflection angle of the laser beams so that the deflection angle corresponding to the time coordinate of one output video signal component coincides substantially with the deflection angle corresponding to the time coordinate of another video signal component.

4. A laser beam scanning system as set forth in claim 1; wherein the signal processor includes an A/D converter, a D/A converter and a line-memory whose capacity corresponds to one scanning time period of the laser beams.

5. A laser beam scanning system as set forth in claim 4; wherein the A/D converter and a write control input terminal of the line-memory receive clock signals whose phases and frequencies vary for each video signal component, while a read control input terminal of the line-memory and the D/A converter receive identical clock signals for each video signal component.

6. A laser beam scanning system as set forth in claim 4; wherein the line-memory is composed of two memory elements which act complementally in a scanning time period.

7. A laser beam scanning system for use in scanning an object in at least one direction to produce a video signal representative of a color image of the object, comprising:
   laser source means for producing a plurality of laser beams each having a different wavelength;
   deflector means for deflecting the laser beams periodically and simultaneously to scan the object at an angle of scanning deflection which is dependent on the wavelength of the laser beam according to the principle of optical diffraction or other optical wavelength-dependent phenomenon, resulting in color dispersion at the output of the deflector;
   a plurality of photosensors each sensitive to the corresponding wavelength of the respective deflected laser beam for photoelectrically converting the respective laser beam from the object into a video signal component of a color tone corresponding to the wavelength; and a signal processor for processing the video signal components derived from the respective photosensors in such a manner that the video signal components are delayed, compressed or expanded based on a time coordinate, the signal processor including an A/D converter, a memory device and a D/A converter which can be controlled by clock signals whose phases and frequencies are varied for each video signal component while the video signal components are input asynchronously with each other due to the color dispersion at the output of the deflector means to thereby output the processed video signal components at the same timing in terms of scanning time to form a video signal so that the influence of the color dispersion at the output of the deflector means is removed from the video signal.

8. A laser beam scanning system as set forth in claim 7; wherein the deflector means comprises an acousto-optical deflector.

9. A laser beam scanning system as set forth in claim 7; wherein the signal processor electronically converts the video signal components from the photosensors which suffer from the color dispersion caused by the deflector means into video signal components which suffer from less color dispersion relative to each other on a real time basis.

10. A laser beam scanning system as set forth in claim 7; wherein the signal processor adjusts the time of the input and output of video signal components to eliminate the influence of the color dispersion caused by the deflector means due to the deflection angle of the laser beams so that the deflection angle corresponding to the time coordinate of one output video signal component coincides substantially with the deflection angle corresponding to the time coordinate of another video signal component.

11. A laser beam scanning system as set forth in claim 7; wherein the clock signals whose phases and frequencies vary for each video signal component are provided for the A/D converter and a write control input terminal of the memory device, while identical clock signals for each video signal component are provided for a read control input terminal of the memory device and the D/A converter.

12. A laser beam scanning system as set forth in claim 7; wherein the memory device comprises a line-memory whose capacity corresponds to one scanning time period of the laser beams, the line-memory being composed of two memory elements which act complementarily in a scanning time period.

13. An apparatus for optically scanning an object comprising: laser means for producing laser beams having beam components of different wavelengths; deflecting means for sweepingly deflecting the laser beams through a given angular range for each scanning period to irradiate the deflected laser beams onto an object along a given locus to thereby scan the object, the deflecting means having a chromatic deflectivity due to the wavelength difference of the beam components so that the respective beam components are angularly deviated from each other during the sweeping deflection thereof through the given angular range to thereby asynchronously irradiate a given point on the given locus at different timings; converting means for converting the respective beam components transmitted from the scanned object into corresponding video signal components on a real time basis such that the video signal components are accordingly held asynchronously relative to each other due to the angular deviation of the deflected beam components; and processing means for processing the asynchronous video signal components to compensate for the angular deviation of the deflected beam components to thereby synchronize the video signal components to each other to produce a composite video signal representative of a color image of the object.

14. An apparatus according to claim 13; wherein the deflecting means comprises an acousto-optical deflector driven by a drive signal having a variable frequency for sweepingly deflecting the laser beams in proportion to the variable frequency to thereby scan the object with the deflected laser beams.

15. An apparatus according to claim 14; wherein the processing means includes means operative during each scanning period for applying a drive signal having a linearly variable frequency to the acousto-optical deflector to enable the same to deflect the respective beam components through the same given angular range in different time intervals shifted from each other due to the angular deviation of the respective beam components.

16. An apparatus according to claim 15; wherein the converting means includes a plurality of photosensors corresponding to the respective beam components and operative on a real time basis during the different time intervals shifted from each other for converting the respective beam components into corresponding analog video signal components.

17. An apparatus according to claim 16; wherein the processing means includes a plurality of A/D converters corresponding to the respective analog video signal components and operative on a real time basis during the different time intervals shifted from each other for converting the respective analog video signal components into corresponding digital video signal components such that the respective digital video signal component is composed of a train of the same number of bit data, a plurality of memories corresponding to the respective digital video signal components and having respective memory locations of the same address arrangement for sequentially storing the respective trains of digital bit data in the respective memory locations according to the same address arrangement, and means for simultaneously retrieving from the plurality of memories the plurality of trains of bit data according to the same address arrangement to thereby synchronize the digital video signal components to each other.

18. An apparatus according to claim 17; wherein the processing means includes means for converting the synchronized digital video signal components into a composite analog video signal.

19. An apparatus according to claim 17; wherein each memory has a first memory section for writing in a train of bit data during a preceding scanning period and reading out the train of bit data during a present scanning period, and a second memory section for writing in a train of bit data during the present scanning period and reading out the train of bit data during a succeeding scanning period.

* * * * *